US007680705B2

(12) United States Patent
Healy et al.

(10) Patent No.: US 7,680,705 B2
(45) Date of Patent: Mar. 16, 2010

(54) METHOD AND SYSTEM FOR ADDITIVE BAR CODES TO MINIMIZE THE SIZE AND OPTIMIZE THE FUNCTION AND USABILITY OF A BAR CODE SCANNABLE BUSINESS CATALOG

(75) Inventors: Tom Healy, Lakeville, MN (US); Norton Lam, Shoreview, MN (US)

(73) Assignee: Jump Technologies, Inc., Eagan, MN (US)

( * ) Notice: Subject to any disclaimer, the term of this patent is extended or adjusted under 35 U.S.C. 154(b) by 718 days.

(21) Appl. No.: 11/028,541

(22) Filed: Jan. 5, 2005

(65) Prior Publication Data
US 2005/0171868 A1 Aug. 4, 2005

(51) Int. Cl.
*G06F 17/30* (2006.01)
(52) U.S. Cl. .................... 705/27; 705/1; 705/26
(58) Field of Classification Search ............ 705/23, 705/26, 27
See application file for complete search history.

(56) References Cited

U.S. PATENT DOCUMENTS

| | | | | | |
|---|---|---|---|---|---|
| 5,324,922 | A | * | 6/1994 | Roberts | 235/375 |
| 5,380,993 | A | * | 1/1995 | Komai | 235/462.01 |
| 5,424,524 | A | * | 6/1995 | Ruppert et al. | 705/8 |
| 6,877,032 | B1 | * | 4/2005 | Philyaw | 705/26 |
| 7,010,501 | B1 | * | 3/2006 | Roslak et al. | 705/26 |
| 7,124,939 | B2 | * | 10/2006 | Calaway et al. | 705/26 |
| 2002/0111877 | A1 | * | 8/2002 | Nelson | 705/26 |
| 2002/0193975 | A1 | * | 12/2002 | Zimmerman | 703/6 |
| 2003/0130909 | A1 | * | 7/2003 | Caci et al. | 705/27 |
| 2003/0173405 | A1 | * | 9/2003 | Wilz et al. | 235/462.01 |
| 2004/0254849 | A1 | * | 12/2004 | Brocke-Benz | 705/26 |
| 2005/0038712 | A1 | * | 2/2005 | Veeneman | 705/26 |

OTHER PUBLICATIONS jumptech.com enables launch of first-ever newspaper designed to leverage print-to-internet technology. PR Newswire, New York, Aug. 28, 2000, pp. 1-2.*

* cited by examiner

*Primary Examiner*—Jason Dunham
(74) *Attorney, Agent, or Firm*—Whitham, Curtis, Christofferson & Cook, P.C.

(57) ABSTRACT

A system and method is provided for automating placement of orders from a catalog that has been JumpCode enabled by inclusion of bar codes. A sequence of additive bar codes uniquely identify each item available from the catalog. A scanner is used for designating items from the catalog by scanning the identifying sequences of bar codes, which include at least a bar code element that uniquely identifies the catalog and the page of an item, and a further bar code element that uniquely identifies an item among the other items on a page, using a common reference scheme that is applicable to each page. This combination of bar code elements is a Jump-Code, and JumpCodes for the items scanned are grouped into orders by affiliate and sent to the respective e-commerce sites of each affiliate, which are designed to handle orders from the catalog. The web sites generate shopping carts from the orders and appropriate URLs are returned to the user, who can use a browser to complete the order by direct communication with the respective web sites.

27 Claims, 4 Drawing Sheets

Figure 1

3463 ssi

| (1 – 10) | (21 – 30) | (41 – 50) | (61 – 70) | (81 – 90) |
|---|---|---|---|---|
| (11 – 20) | (31 – 40) | (51 – 60) | (71 – 80) | (91 – 100) |

210

| Quantity 3 | Quantity 4 | Quantity 5 | Quantity 10 | Quantity 12 |
|---|---|---|---|---|
|  |  |  |  |  |

220

METHOD AND SYSTEM FOR ADDITIVE BAR CODES TO MINIMIZE THE SIZE AND OPTIMIZE THE FUNCTION AND USABILITY OF A BAR CODE SCANNABLE BUSINESS CATALOG

BACKGROUND OF THE INVENTION

1. Field of the Invention

The present invention generally relates to a system and method for connecting conventional ordering materials, such as catalogs distributed in printed form or on CD-ROM, to Internet based purchasing and distribution systems.

2. Background Description

E-commerce applications where companies conduct business over the Internet have been growing in recent years. More and more businesses are developing and using Internet web sites for doing business. However, these web sites often operate in parallel with existing methods relying on faxes and the telephone. Most businesses continue to order replenishable products out of printed catalogs using faxes and the telephone to place orders. This is acceptable when the customer is ordering products infrequently or where there just a few products and a salesperson's intervention is required.

When items that need to be ordered are replenishable, and thus ordered more frequently, and there are many items to choose from, each with many potential options, it would be ideal to order them electronically. However, web sites simulating large catalogs are very difficult to navigate and are generally too tedious to use.

Businesses ordering items over the phone and via faxes find the task equally tedious and at best error prone. End-users or salespeople must manually write down part numbers, quantities and the like. While this approach has long been used, businesses are seeking ways of making this process more efficient, because initial entry of orders, and correction because of human error in manually writing down information, is costly.

Catalogs with tens of thousands of parts with many associated options related to quantities, colors, sizes, models and the like are very expensive and tedious to develop, and the result is an enormous catalog that is end-user cumbersome. It would be desirable to have catalogs that are more compact and easier to use. Most vendors already have existing catalogs that they would prefer to continue using with minor changes, rather than redo the entire catalog. Redoing the entire catalog is expensive, time consuming and may disorient users familiar with the existing catalog.

SUMMARY OF THE INVENTION

It is therefore an object of the present invention to provide a system enabling a business to integrate its printed catalog with its Internet web site.

It is a further object of the invention to provide a smooth migration path from cumbersome catalogs to catalogs that are easier to navigate.

Another object of the invention is to simplify the use of visually displayed catalogs.

The invention provides for simplifying and automating placement of orders from a catalog that has been JumpCode enabled by inclusion of bar codes. The bar codes provide a mechanism for a catalog user to designate electronically items in the catalog, corresponding to a catalog database maintained by the owner of the catalog. The bar codes are so arranged and associated with the catalog as to uniquely identify each item available from the catalog. This is accomplished by having bar codes that identify the catalog itself and then the location of the item in the layout of the catalog. Typically, bar codes will identify the page within the catalog where the item is located, as well as an identifier uniquely associated with the item on the page. Furthermore, all items available from the catalog may not be listed separately, but rather may be obtained by adding attributes, such as color and type, to a listed item. Bar codes may be used to add these attributes to the identifying sequence of bar codes for an item, thereby enabling a smaller and better organized catalog.

Any of a number of varieties of bar code readers can be attached to a personal computer, PDA or any device capable of accessing a unique destination web site using a remote Internet service provider (ISP) communicating through an intermediary web site. The bar code can represent unique destination web sites, product information with units of measure and quantities, or other e-commerce information that makes these additive bar codes a JumpCode. The JumpCodes are displayed in a uniquely laid out catalog that is specifically designed for business to business(B2B) e-commerce applications by the JumpCart system.

A scanner is used for designating an item from the catalog by scanning the identifying sequence of bar codes, which is then sent to a computing device such as a personal computer. The computing device sends the bar code sequence over the Internet to a JumpCart server, which has access to the same information contained in the catalog and is able to find the item represented by the bar code sequence. The JumpCart server then converts the bar code sequence into a format readable by the web site that is designed to handle orders from the catalog. The web site generates a shopping cart from the order and sends appropriate URLs back to the server. The server then sends those URLs back to the computing device, where they are displayed for a user. The user can then modify and finalize the order by direct communication with the respective web sites, using a browser.

One aspect of the invention is a system for automating placement of orders from a catalog. The scanner designates an item on a page in the catalog by scanning an identifying sequence of bar codes. The identifying sequence is a plurality of bar code elements individually scanned, the combination making up a JumpCode. At least one of these bar code elements is located on a page reference. Typically, the page reference is the catalog page on which the item appears, and this bar code element uniquely identifies the catalog and the page within the catalog. At least one further bar code element is located on a common reference, which is typically a pull-out tab (in a printed catalog) or a separate window (in a catalog displayed from a CD-ROM). The idea behind the common reference is that the same list of bar codes on the common reference applies to each page in the catalog. For example, if there are less than a hundred items on each page in a catalog and each item on the page is identified by a different number, then a common reference having bar codes for each of the one hundred numbers may be used for scanning this further bar code element. There may be additional bar codes representing quantity, color, or other attributes of items in a catalog. Such bar codes on the common reference allow a more compact representation of catalog offerings. Both the page reference and the common reference are included as part of the catalog. For each item uniquely identified by a JumpCode combination of bar code elements, the JumpCode is then converted into an order at an e-commerce web site.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is representation of a typical catalog page, JumpCode enabled by a bar code.

DETAILED DESCRIPTION OF A PREFERRED EMBODIMENT OF THE INVENTION

Figure 3:
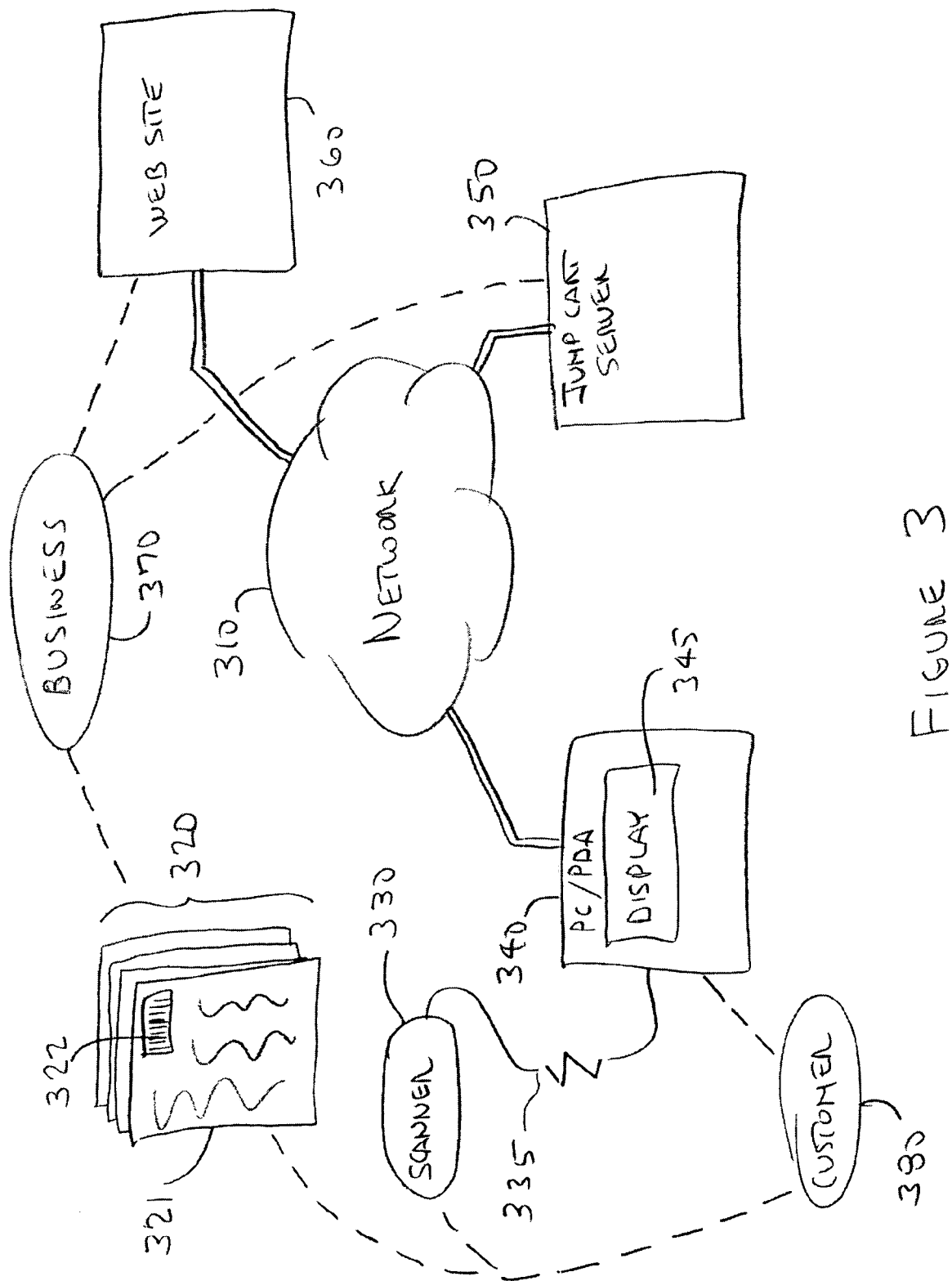
FIG. 3 is a diagram showing the components of a system for using the invention.

Referring now to the drawings, and more particularly to FIG. 3, there is shown a diagram of the components of an exemplar system for using the invention. A catalog 320 is shown with a typical page 321 having a bar code 322 uniquely identifying both the catalog 320 and the page 321. A scanner 330 for reading bar code 322 is attached by data link 335 to device 340 for receiving the output of scanner 330. The device 340 may be personal computer (PC) or a personal data assistant (PDA) or any other device connectable to network 310 (e.g. the Internet) and via network 310 to JumpCart Server 350. Device 340 serves as a client to JumpCart Server 350 and transmits to JumpCart Server 350 the output of scanner 330. JumpCart Server 350 processes the output of scanner 330 and generates ordering information that is sent to web site 360 through network 310. Web site 360 then creates a shopping cart corresponding to the ordering information, and sends the shopping cart information over network 310 to device 340 for presentation on display 345 using a browser application appropriate for device 340. Customer 380 then completes the order directly with web site 360 over network 310. It should be noted that in typical implementations of the invention, customer 380 will have possession of a copy of catalog 320 and will operate scanner 330 and device 340, as shown by the dotted lines from customer 380 on FIG. 3. It should also be noted that in a typical implementation a business 370 will be responsible for development of catalog 320 and web site 360, and provides to the JumpCart Server 350 the information about catalog 320 and the operation of web site 360 necessary for JumpCart Server 350 to prepare ordering information. These functions of business 370 are shown by the dotted lines from business 370.

A best mode of implementing the invention is called JumpCart, and includes the following entities:

A uniquely laid out and printed catalog that has scannable JumpCodes.

JumpCodes are bar codes that are specifically designed for JumpCart and can be combined, with consecutive scans, to include a Destination Web site prefix, quantities, items and other options. JumpCodes may be placed in catalogs in various ways, such as on pull out tabs, headers and footers, margins and the like. These JumpCodes may refer to catalog pages, quantities, colors, packaging or other attributes of a product order. For example, a set of colors applicable to a large number of products can be represented by JumpCodes in a single pull out tab, and can be applied to a product being ordered without having to list as separate items the same product, once for each color (or, in general, once for each different combination of attributes). A catalog laid out with these techniques is substantially smaller and more user friendly than a catalog that simply has a separate item for every variation.

A scanner that is capable of scanning bar codes.

These scanners have many different characteristics and include standalone pens, matchbox sized devices, PDA's and telephones with built in scanners, and an ever changing evolution of new devices. The scanner needs to be attached to some device that is capable of communicating with an intermediary Internet Server, the JumpTech Server. This attachment can be direct as with a PDA or cell phone with a built in scanner, or it can be through a cable attached to a USB or COM port.

An intermediary Internet server.

The JumpTech Server is an intermediary Internet server for translating the bar code information (JumpCodes) into information that the Destination Web Site will be able to process. The Destination Web Site is an e-commerce web site of a vendor that is equipped to process an electronic order.

Those skilled in the art will observe that while the invention applies to traditional paper catalogs, with JumpCodes printed on paper pages, the principles of the invention can also be applied to catalogs displayed in media other than paper. For example, a catalog may be distributed on microfiche, or a CD ROM, or be available on a web site, with the "scanner" element being implemented with light pens or other appropriate technology. Whatever the display medium for the catalog, the invention may be adapted by dividing the catalog into display units suitably sized so that each item on any display "page" may be distinguished by a different symbol drawn from an ordered set (e.g. typically, the numbers from 1 to 100). An ordered display of bar codes corresponding to this ordered set of symbols serves as the primary component of a common reference for each display page. This primary component may be supplemented by similarly ordered sets of bar codes corresponding to item attributes such as quantity and color. This methodology provides uniqueness within a display unit or "page". This is then coupled with another independently scanned bar code element which uniquely identifies the display unit or "page", resulting in the additive bar codes or JumpCode of the invention.

Figure 2:
FIG. 2 is a pull out page of bar codes usable for identifying and quantifying the items from a catalog.
Figure 2:
Figure 2:
Figure 2:
Figure 2:

There are many variations to the JumpCart process, but one implementation—for an end-user wishing to order replenishable office products from a catalog that has been enabled for JumpCodes—may be described as follows:

1. The end-user opens a JumpCode enabled catalog and finds a desired item on a particular page of the catalog. Such a page is shown in FIG. 1. From that page the end-user scans a JumpCode 110 that represents the page number of the catalog being viewed. The JumpCode is on that page of the catalog, and is commonly placed on the same location on each page of the catalog. The user then scans the JumpCode of the relative product number associated with the selected item listed on the page. For example, in a conventional printed catalog that is JumpCode enabled, there will be a pull out tab at the back of the catalog having bar codes in an ordered arrangement as shown in FIG. 2. The items will be listed in order (using symbols from an ordered set, e.g. the numbers 1 through 50 or alphabet characters a through z) on the pull out tab, with bar codes for each symbol in the ordered set. The user leaves that pull out tab "pulled out" for future selections. He then can scan a quantity 220 from that same pull out tab.

2. Then the end-user engages a scanner, which may be attached via a cable or a wireless connection to a personal computer. Other configurations are possible, such as having the scanner built in to a personal digital assistant.

3. The JumpCart client application running on the computing device automatically detects the scanner connection and downloads the codes from the scanner.

4. The JumpCart client application puts all the codes into an XML packet that is then sent to the JumpTech server.

5. The JumpCart server translates the codes into products.

6. Any JumpCodes or Universal Product Codes (UPCs) translated into products are grouped together by affiliate to create an order. An affiliate is a vendor that the end-user buys products from (e.g. an independent office products dealer). Quantities are determined by the number of times the particular product was scanned, or by using quantity codes. Quantity codes scanned consecutively are added together to create the final quantity.

7. In the case where only one order was created (i.e. only items from one affiliate were scanned), the process skips to step 9. If more than one order was created, the JumpCart server returns a URL that displays on a single page all the orders created for the end-user to review.

8. The end-user clicks on a "Place Order" button for one of the orders.

9. The JumpTech server retrieves the order and converts it into an XML packet that is sent to the affiliate's e-commerce web site. The XML packet may use the cXML protocol, but those skilled in the art will appreciate that other protocols may be used without departing from the spirit of the invention.

10. The e-commerce web-site creates a shopping cart and sends a URL back to the JumpCart server.

11. The JumpCart server then displays the URL in the browser that was already open from showing the list of orders. In the case of only one order, the URL is sent back to the client and client opens a browser to display the URL received. If the URL allows it, the end-user then sees this shopping cart and can change items in it. This is frequently the first time the end-user sees the actual price that he will have to pay for the item. This price could be customized for this specific user, reflect discounts, reflect specials currently in effect, and so on.

12. Any changes made by the user to the entities in these windows will be communicated directly to the affiliate's e-commerce web site.

Figure 4:
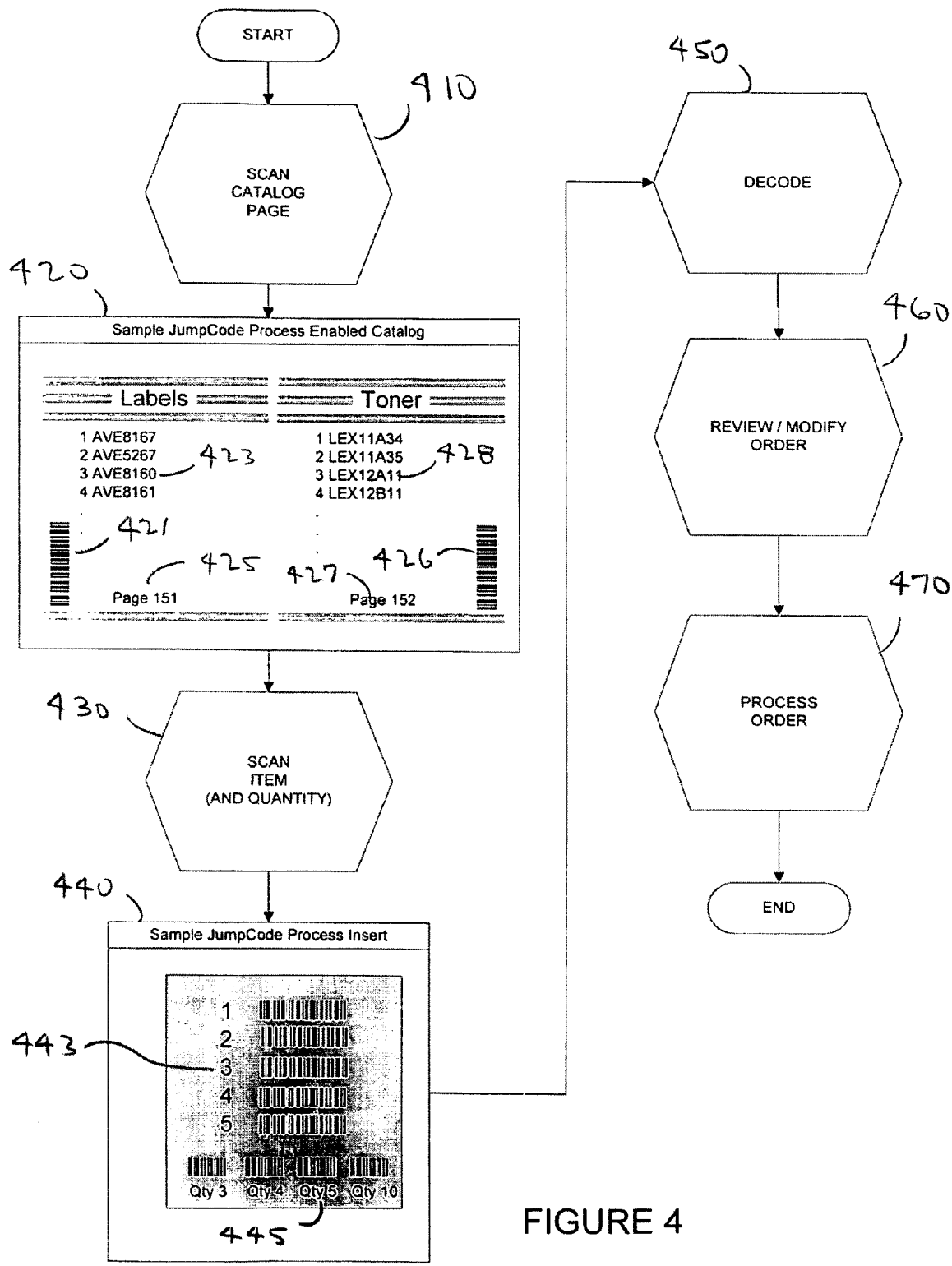
FIG. 4 is a flow chart showing use of the invention.

The foregoing details may be understood with reference to the flow chart shown in FIG. 4. Suppose a user of a JumpCode enabled catalog wishes to place an order for labels. The first step is to find the desired product in the catalog 420. The user locates the desired labels 423 on a page (item 425) of the catalog 420. Using a bar code scanner (not shown), the user scans the bar code 421 uniquely representing the catalog and a page number within the catalog. Note that each page of the catalog will have a bar code, as shown by item 426, and that bar code will designate the same catalog 420 but a different page number (e.g. item 427).

Having located the desired item, the user then finds the JumpCode process insert 440. The user notes that a number appears beside the desired labels 423. He then scans the bar code 443 that matches that number, and he may also scan a bar code 445 representing a desired quantity. If he scans the bar code 445 it means that he wants five (Qty 5) of the labels 423. If no quantity is scanned, a default quantity "one each" will be assumed. It should be noted that the scanner has now recorded three bar codes: the bar code 421, which identifies the catalog 420 and page number (item 425); the bar code 443, which identifies the product 423; and the bar code 445, which identifies the quantity of the product. It should also be noted that the JumpCode process insert 440 can serve the desired identification function for the other pages in the catalog 420. For example, if the user had scanned the bar code 426 associated with another page (item 427), scanning the same bar code 443 on the insert 440 would represent a different product 428.

The series of bar codes 421, 443 and 445 entered by the user are then processed automatically, including decoding 450 the characters represented by the bar codes into specific items and quantities for transmission via the JumpCart server 350 to a web site 360, which creates a shopping cart and returns the order to the display 345. The next activity requiring attention from the user is to review (and possibly modify) 460 the order. Then the order is processed 470.

This scenario is just an example and may as well have been shown for any replenishable product that is amenable to a catalog layout. Included could have been medical supplies, automotive supplies, groceries, janitorial supplies, or anything that is carried by a distributor that could be laid out in a catalog.

If entities are not products, what is done with them depends on what the entity is. For instance, a calendar event might be e-mailed as an appointment to the end user that scanned the code. Business card information could be converted into a vCard that could be imported into the end-use's contact database. Or an e-mail window could be popped up for a JumpCode that represents an e-mail address. The JumpCart server is designed so that almost any type of item can be represented by a JumpCode and any operation can be done on that item. Where the items are not products, the above process is essentially the same. The only difference is that orders are not created and communication does not need to occur with an e-commerce web site. The JumpCodes are simply converted into the item, and the item is returned to the user in some way, most likely by a browser or in an e-mail.

The JumpCart server and its various operations will now be described.

UPC Translation

The JumpCart server database holds many products grouped by supplier or dealer. Each dealer is given express permission to access a supplier's database. Each dealer is also able to create a database of products of its own. When the JumpCart server gets a code it recognizes as a UPC, it first looks in the dealer's database, then in the suppliers' databases it has permissions to do so. The order in which it looks in the suppliers' databases depends on the priority set up for each. The priority is determined by which supplier the dealer purchases from first, second, or third. In most cases, if a product is found in more than one database, it will have the same product identifier (also known as a Stock Keeping Unit or SKU), but that is not always the case.

JumpCode Translation

JumpCodes are created by the JumpCart server when products are imported into a product database, or other item types are created in the JumpCart server database. A JumpCode can contain more information than just a code-to-item translation. Below is a list of different types of JumpCodes that have been defined in a preferred implementation of the invention. Those skilled in the art will understand that the invention can be implemented with other particulars without departing from the spirit of the invention.

| Regular JumpCode | This is a four character code made up of alphanumerics and/or symbols. It can be placed in any printed material and represent any |
|---|---|

| | |
|---|---|
| Custom Catalog JumpCode | kind of item defined in the system. This code is used by suppliers in their product catalogs to represent products. This code is put into a catalog generated by JumpEdit, a catalog creation tool. The code can be a four character code like the Regular JumpCode above, or it may contain an additional two character affiliate prefix. The affiliate prefix is used to restrict the catalog to the affiliate so that a competitor cannot come in and use the custom catalog the affiliate worked so hard to create. |
| Custom Catalog JumpCode with Unit of Measure and/or Quantity | Since we create the code that gets placed in the custom catalogs, we can add additional information to the code. In some cases, the affiliate may want to indicate a certain unit of measure for the product, or a specific quantity. For example, a one character unit of measure and/or two character quantity can be added to the code. It will still appear as one bar code and the JumpCode Server will discern between all the parts. |
| General Line Catalog JumpCode | In some situations, Regular JumpCodes can not be put next to each product in a catalog without changing layout or adding a significant number of pages to the catalog. This can happen, for example, with a general line catalog. One way of overcoming this problem is to use pull out pages to "create" JumpCodes on-the-fly. For example, if a catalog does not have a JumpCode on each page representing the catalog and page, additional pull out pages can be used to identify this information. Instead of scanning a single JumpCode on the page (as with a normal JumpCode enabled catalog), two special JumpCodes are scanned on a pull out page, one identifying the catalog and another indicating the page number. For example, the catalog identifier could be three characters and the page number could be compressed into two characters using hex notation, resulting in a single five character code that combines a three character catalog identifier and two characters that indicate a page number. A second code would be scanned from another pull out page representing the ordinal of the product on the page. Each item on the page has a different ordinal. More codes could also be added and scanned to indicate color, size or other attributes for a product. |
| Par Level Inventory JumpCode | The Par Level JumpCode is one that is put on a label and affixed to a shelf in a supply room, or in other locations such as catalogs, product trays, etc. It contains the four character regular JumpCode and a three character department/location code. The location code determines from which location to decrement, increment or set the quantity. |
| Quantity JumpCode | Defined as any six character code that begins with "QTY". The last three are numbers that define the quantity. Any quantity codes scanned consecutively are summed together to create the final quantity. |
| Custom Codes | It is possible to configure the JumpCart Server to translate bar codes that are in a catalog, but were not created by JumpCart. |

Client-server Communication

The JumpCart server communicates with the clients, whether it be a PC client or a PDA client, using XML. Each XML request includes a type string that defines the action the client wants performed. Depending on the type, different XML content is sent to the server as arguments to define the action to be performed.

Code Translation Process

Most of the request types sent to the server by the PC client involve bar code translation. When the server receives a code, it first determines if it is a UPC or a JumpCode. If it is a UPC, it will follow the steps defined above. If it is a JumpCode, the server will determine what type of JumpCode it is, using the request type and/or the code's length. If it's more than a regular JumpCode, the server will break it into its respective parts. In most cases, the four character JumpCode will determine what the item is, and the other information in the code will give information for restricting the code (affiliate prefix) or provide information for the resulting shopping cart (unit of measure or quantity). In the case of a general line catalog code, the data in two consecutive codes are used to determine what the actual item is.

Once the type of code is determined, it is used to find the item it represents. Then, depending on what the item is, an operation is performed. The following table gives examples types of items in a typical implementation of the invention and what operation would be performed on the item.

| | |
|---|---|
| Product | Any items found to be products are grouped together by affiliate and saved as an order. Once all the orders are created, they are converted into XML and sent to the appropriate e-commerce provider. |
| Par Level Product | Instead of creating an order, product scans are used to increment or decrement a supply room inventory (see below). |
| One URL | If a code represents a single URL, the URL is retrieved and then personalized. Personalization is done using user demographics collected during user registration. An example might be a URL that gives a weather forecast. If the user's zip code was collected during registration, the zip code will be placed in the URL providing the weather |

-continued

| | |
|---|---|
| | forecast for the area the user lives in. |
| A Set of URLs | A code representing a set of URLs can return a different URL depending on the values of a user's demographics. For instance, a perfume advertisement might have two URLs associated with a code. If the user scanning is male, the page might be titled "A Great Gift for Her". If the user is female, the page might read "Treat Yourself". |
| E-mail Address | A code representing an e-mail address would bring up a new message window with the e-mail address already in the "To" field. |
| Calendar Event | A calendar event would likely be converted into an appointment that is e-mailed to the user. By opening the e-mail, the event is automatically placed in their calendar. |
| Business Card | A business card item could be converted into a vCard that is again e-mailed to the user. The vCard format is a standard format that can be imported into most contact databases. |
| Other | Almost any kind of entity can be linked to a code. It just has to be defined in the JumpCart system. |

Once the codes have been translated one of five items could be returned to the PC client.
  A URL that the code was translated into and personalized for the user.
  A URL for the e-commerce site where the products being ordered were sent to.
  A URL showing pending orders that need to be submitted to e-commerce sites.
  A list of products that codes were translated into but which the affiliate does not sell.
  A list of codes that were not able to be translated into any item.

The JumpCart server may return more than one URL to the client, and these may be displayed in one window or in a plurality of windows, depending upon the capabilities of the client computing device and the preferences of the user. Either of the lists (product codes translated but which the affiliate does not sell; codes that could not be translated) returned from the JumpCart server will trigger a message dialog reporting the not-sold items or unknown codes, respectively.

Par Levels

One aspect of the invention is a par level system that allows an end-customer to set up supply room locations with a list of items that each have a minimum (par) level. A label containing the JumpCode corresponding to an item is placed on the supply room shelf under the item. Each user that takes an item from the supply room would scan the JumpCode on the supply room shelf under the item. When the user docks the scanner, the codes are sent to the server. Instead of creating an order, the server decrements the recorded inventory in the supply room. If the recorded inventory ever goes below the par level, an order is automatically triggered with a minimum order quantity. When the order is received, the supply room manager scans in the items and the server will increment each item's quantity to reflect the new inventory.

JumpEdit

Any user/dealer given appropriate permissions can create PDF catalogs, sheets of labels, or order forms used by some customers to place orders. Each user/dealer takes a list of product SKUs and formats them to the proper form, including other desired supporting attributes such as price, quantity and unit of measure.

A catalog creator can be used to create a catalog with a header image (e.g. the affiliate's logo) and a table. Each cell in the table can contain a product description, the SKU, an image representing the product, a unit of measure, and a JumpCode. The catalog can be customized to include any information the user would like. The catalog creator can also be used to group like products together, and otherwise format the products selected by the dealer in a manner giving the catalog a professional appearance having characteristics distinctive for the dealer.

For each product selected by the dealer, label sheets can be printed containing at least a description, SKU, and unit of measure. Labels are also customizable. The labels can be printed and affixed to a supply room shelf, or elsewhere as described above. The catalog sheets described above can serve as order forms, with the images removed and space added for writing in a quantity. This catalog style order form can be distributed by materials managers along with delivered product in order to facilitate the placing of reorders.

To create any of these forms, a wizard-like interface in the web browser asks for the list of SKUs and parameters necessary for creating the form. The server gets the SKU list, finds the product represented by the SKU and uses that information to create the form in PDF format.

JumpCodes

For the best mode of implementing the invention, it is preferable that JumpCodes be built from the entire readable ASCII set. Thus, a four place product identifier provides approximately 100*100*100*100=10 million combinations. To this may be appended an optional one place Unit Of Measure (UOM) code and an optional two place quantity code. After a scanned code is uploaded to the server, the server breaks it into its component parts. Up to three lookups have to be done, one to determine the correct product SKU, one to determine the correct UOM and one to determine the correct Quantity. Each database supplier may have their own desired UOM's and Quantities. Each scanner in the system is associated to a dealer. When the server receives a scan, it first checks the private database of the associated dealer for the corresponding code. If the code is found then the database entry associated with the code is used. If the code is not found in the dealer's private database, the search continues in additional databases following the hierarchy setup for that dealer. If a product corresponding to the code is found within this hierarchy, the code will be sent on to the e-commerce provider. If the code is not found within this hierarchy, the dealer does not carry the product. Additional databases will be checked and if a match is found the consumer will be advised which product was not available from the associated dealer. If the code is not found anywhere in the JumpCode server database, the code that was not found will be displayed to the consumer, in a list of "not found" codes as described above.

Catalog Codes

Each catalog is uniquely identified by a JumpCode. In the preferred implementation, each catalog page has a Catalog Code, which is a JumpCode made up, respectively, of three positions representing the catalog and two positions representing the page number. Each item on the page will have an item number associated with it. To order an item on the page, the consumer first scans the Catalog Code and then scans the associated item number. Preferably, the item number to be scanned is located on a special pull out sheet. The pull out sheet includes bar codes that uniquely correspond to the ordinal designations for each particular product as shown on the particular page of the catalog.

Quantity Codes

Quantities can also be indicated using bar codes on a pull-out sheet. One implementation is shown in the bottom row of FIG. 2. In another implementation, quantity codes could have a length of 6 and start with the letters "QTY" followed by the quantity. To scan a quantity of 100 items, you would first scan the item, then select the "QTY100" quantity bar code. Quantity codes are additive, so to scan the quantity "105" you could scan the "QTY100" quantity code followed by the "QTY005" quantity bar code.

For example, using FIG. 1 as a page from a catalog, if a buyer wants a dozen packages of ink-jet printable tent cards (illustrated in image A 120 and shown as line item number 3 under the category "Tent Cards" 130 in the first column of FIG. 1), three JumpCode scans are required. First, the Catalog Code bar code 110 is scanned. Then, using FIG. 2 as a pullout page, the item number 3 bar code (210) is scanned. Finally, again using FIG. 2 as a pullout page, the "Quantity 12" bar code (220) is scanned.

The sequence of Catalog Code 110, representing page 457 of the catalog being used, and item number 3 (210) on the pull out sheet uniquely identifies the ink-jet printable tent cards 130. This unique identification is cross referenced in a database on the JumpCart server to derive the SKU. The quantity code 220 then determines that twelve of the tent cards should be placed in the order.

Multiple Vendor capability

A consumer can scan multiple items across multiple vendors. When the order is placed the JumpCart server uses the user given to it by the client to determine which vendors are assigned to this scanner. Each code has a supplier type associated with it. All product labeled as type "office product", for example, would go to the office product vendor, all products labeled "medical product" would go to the medical supplies vendor. If the order was made up of both office products and medical products, a Pending Order page would be displayed to show both orders. The user could then click a "Place Order" button for each order to actually place the order to the e-commerce site. The Pending Order page pops up in a new window for each order than is placed and displays the shopping card associated with that order.

Dealer Editing of JumpCodes

A dealer can create and modify its own JumpCodes. If a dealer tries to modify a supplier's JumpCodes that they don't own, the system will automatically create a duplicate copy of this code in the dealer's database. This will make it appear to the dealer that the dealer can modify the supplier's JumpCodes, but in fact the modified codes will only appear in the dealer's database. Both the dealer's database and the supplier's database will be in the comprehensive database that is managed by the JumpCart server application.

Dealer Uploading of JumpCode Images

A dealer can upload JumpCode Images to a dealer's private directory either one at a time as a GIF or JPG, or multiple images can be combined in a zip file.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A system for automating placement of orders from a catalog, comprising:
   means for using a bar code to uniquely identify the catalog, the catalog having a layout comprising one or more display pages with a plurality of items being located on each display page;
   means for using bar codes to uniquely locate each of said items by reference to said layout of display pages and by further reference to a location of said item on one of said display pages, said item locating means further comprising
   at least
      means for uniquely locating a display page of said layout, and
      means for uniquely locating said item on said uniquely located display page, the means for uniquely locating said item being commonly usable for catalog items on different display pages;
   a scanner for designating an item in the catalog by scanning a sequence of said bar codes, the sequence in combination uniquely locating the item, said sequence uniquely locating at least said display page within the catalog and said item on said display page, both said display page locating means and said means for uniquely locating the item on the display page being part of said catalog; and
   automated means for converting the locating sequence of bar codes into an order at an e-commerce web site, wherein
   the bar code uniquely locating the display page within the catalog is located on the page in the catalog on which said item is located and uniquely locates said catalog and said page within said catalog; and
   the bar code uniquely locating the item on the display page is contained on a common reference that displays an ordered series of symbols and corresponding bar codes, where each item is uniquely located on each catalog page by a symbol in said series.

2. The system for automating placement of orders from a catalog as in claim 1, wherein the automated converting means further comprises:
   a computing device for receiving from the scanner the locating sequence of bar codes;
   a server for receiving from the computing device the locating sequence of bar codes scanned by the scanner, and for sending to an e-commerce web site an order containing the designated item; and
   a server application for translating the received sequence of bar codes into an order readable by said e-commerce web site.

3. The system for automating placement of orders from a catalog as in claim 1, wherein the common reference further displays a series of bar codes corresponding to different values of an attribute distinguishing orders of said item.

4. The system for automating placement of orders from a catalog as in claim 1, wherein the catalog is a printed catalog and the common reference is one or more pull-out tabs in the printed catalog.

5. The system for automating placement of orders from a catalog as in claim 1, wherein the catalog is displayed from a CD-ROM on a computing device, and the common reference is displayed from said CD-ROM in one or more windows on said computing device.

6. The system for automating placement of orders from a catalog as in claim 2, wherein said server application is distributed between said server, said computing device, and a server at said e-commerce web site.

7. The system for automating placement of orders from a catalog as in claim 6, wherein said computing device is a personal computer, the scanner is connected to the personal computer by a wireless link, and the portion of said server application distributed to the personal computer includes putting the identifying sequence of bar codes into an XML packet using the cXML protocol.

8. The system for automating placement of orders from a catalog as in claim 2, wherein said computing device is a personal digital assistant and the scanner is built into the personal digital assistant.

9. The system for automating placement of orders from a catalog as in claim 2, wherein said server application includes a database associating each catalog item with the locating sequence of bar codes, and wherein said database resides on said server and a portion of said server application residing on said server includes a function for looking up in said database a unique item corresponding to said locating sequence of bar codes.

10. The system for automating placement of orders from a catalog as in claim 2, further comprising a plurality of designated items, said items being grouped into a plurality of orders by said server, said grouping being responsive to a selection of affiliates by a user of said computing device, each of said plurality of orders being sent to an e-commerce web site associated with said respective affiliate.

11. The system for automating placement of orders from a catalog as in claim 10, further comprising means for receiving from each of said plurality of e-commerce web sites a shopping cart created from said respective order; and means for said computing device to display said plurality of shopping carts for said user, said user being able to use said display to modify and finalize each order.

12. A method for automating placement of orders from a catalog, comprising the steps of:

using a bar code to uniquely identify the catalog, the catalog having a layout comprising one or more display pages with a plurality of items being located on each display page;

using bar codes to uniquely locate each of said items by reference to said layout of display pages and by further reference to a location of said item on one of said display pages, said item locating step further comprising at least a step for uniquely locating a display page of said layout, and a step for uniquely locating said item on said uniquely located display page, the step for uniquely locating said item being commonly usable for catalog items on different display pages;

designating an item on a page in the catalog by scanning a sequence of bar codes, the sequence in combination uniquely locating the item, said sequence uniquely locating at least said display page within the catalog and said item on said display page, both said display page locating step and said step for uniquely locating the item on the display page being operable on said catalog;

converting by automated means the locating sequence of bar codes scanned in the designating step into an order at an e-commerce website, wherein the bar code uniquely locating the display page within the catalog is located on the page in the catalog on which said item is located and uniquely locates said catalog and said page within said catalog; and the bar code uniquely locating the item on the display page is contained on a common reference that displays an ordered series of symbols and corresponding bar codes, where each item is uniquely located on each catalog page by a symbol in said series, receiving by a computing device the identifying sequence of bar codes scanned in the designating step;

receiving by a server the identifying sequence of bar codes from the computing device;

translating by the server the received sequence of bar codes into an order readable by an e-commerce web site; and sending the translated order to the e-commerce web site.

13. The method for automating placement of orders from a catalog as in claim 12, wherein the common reference further displays a series of bar codes corresponding to different values of an attribute distinguishing orders of said item.

14. The method for automating placement of orders from a catalog as in claim 12, wherein the catalog is a printed catalog and the common reference is one or more pull-out tabs in the printed catalog.

15. The method for automating placement of orders from a catalog as in claim 12, wherein the catalog is displayed from a CD-ROM on a computing device and the common reference is displayed from said CD-ROM in one or more windows on said computing device.

16. The method for automating placement of orders from a catalog as in claim 12, wherein said server application is distributed between said server, said computing device, and a server at said e-commerce web site.

17. The method for automating placement of orders from a catalog as in claim 16, wherein said computing device is a personal computer, the scanner is connected to the personal computer by a USB cable, and the portion of said server application distributed to the personal computer includes putting the identifying sequence of bar codes into an XML packet using the cXML protocol.

18. The method for automating placement of orders from a catalog as in claim 12, wherein said computing device is a personal digital assistant and the scanner is built into the personal digital assistant.

19. The method for automating placement of orders from a catalog as in claim 12, wherein said server application includes a database associating each catalog item with the locating sequence of bar codes, and wherein said database resides on said server and a portion of said server application residing on said server includes looking up in said database a unique item corresponding to said locating sequence of bar codes.

20. The method for automating placement of orders from a catalog as in claim 12, wherein a plurality of items is designated in the designating step, said items being grouped into a plurality of orders, said grouping being responsive to a selection of affiliates by a user of said computing device, each of said plurality of orders being sent to an e-commerce web site associated with said respective affiliate.

21. The method for automating placement of orders from a catalog as in claim 20, further comprising the steps of:

receiving from each of said plurality of e-commerce web sites a shopping cart created from said respective order; and displaying at said computing device said plurality of shopping carts for said user, said user being able to use said display to modify and finalize each order.

22. The method for automating placement of orders from a catalog as in claim 12, further comprising the steps of:
   registering a user for said designating step;
   including user information from the registering step into the order sent to the e-commerce site; and
   creating by the e-commerce web site an order fulfillment that is dependent upon the user information.

23. An apparatus for automating placement of orders from a catalog, said catalog being comprised of a plurality of display units for displaying items for ordering, comprising:
   a first bar code uniquely locating each of said display units within said catalog, said first bar code being a page reference located on each said respective display unit and uniquely identifying said catalog and said respective display unit;
   a common reference displaying a series of bar codes representing, respectively and uniquely, each of an ordered set of symbols used to uniquely locate an item displayed on a display unit, where each item displayed on a display unit is uniquely identified by association on said display unit with a respective one of said ordered set of symbols, the bar codes on said common reference being commonly usable for catalog items in different display units;
   a scanner for designating an item in the catalog by scanning an identifying sequence of bar codes comprising a first bar code serving as a page reference of the display unit on which the item is displayed together with a bar code from said common reference representing a respective one of said symbols uniquely associated with said item on said display unit;
   automated means for converting the identifying sequence of bar codes into an order at an e-commerce web site,
   wherein both said page reference and said common reference are part of said catalog.

24. An apparatus for automating placement of orders from a catalog as in claim 23, wherein the common reference includes an additional series of bar codes representing an ordered set of attribute values, and wherein said identifying sequence for an item includes a bar code representing one of said set of attribute values.

25. An apparatus for automating placement of orders from a catalog as in claim 23, wherein the display unit is a page in a printed catalog, the page reference is the page in the catalog on which said item is identified, and the common reference is one or more pull-out tabs in the printed catalog.

26. An apparatus for automating placement of orders from a catalog as in claim 23, wherein the catalog is displayed from a CD-ROM on a computing device, the unit of display is tailored to fit a screen size of the computing device display, and the common reference is displayed from said CD-ROM in one or more windows on said computing device display.

27. An apparatus for automating placement of orders from a catalog as in claim 24, wherein said attribute value is a quantity of said item.

\* \* \* \* \*